(12) United States Patent
Algrain

(10) Patent No.: US 7,174,714 B2
(45) Date of Patent: Feb. 13, 2007

(54) ELECTRIC TURBOCOMPOUND CONTROL SYSTEM

(75) Inventor: Marcelo C. Algrain, Dunlap, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 11/010,958

(22) Filed: Dec. 13, 2004

(65) Prior Publication Data
US 2006/0123784 A1 Jun. 15, 2006

(51) Int. Cl.
| F02B 33/44 | (2006.01) |
| F02B 37/04 | (2006.01) |
| B60K 6/04 | (2006.01) |
| F02G 1/00 | (2006.01) |
| F02B 39/10 | (2006.01) |
| F02B 39/04 | (2006.01) |

(52) U.S. Cl. ............... 60/608; 60/597; 290/52; 290/40 A; 701/108

(58) Field of Classification Search .......... 60/607–609, 60/578–579; 290/52, 40 A; 701/108
See application file for complete search history.

(56) References Cited

U.S. PATENT DOCUMENTS

| 4,312,183 | A | | 1/1982 | Regar .................. 60/608 |
| 4,445,337 | A | | 5/1984 | McCreary ............ 60/608 |
| 4,485,793 | A | * | 12/1984 | Oguma ................ 123/559.3 |
| 4,680,933 | A | | 7/1987 | Bozung et al. ....... 60/608 |
| 4,704,571 | A | * | 11/1987 | Rosenberg ........... 60/597 |
| 4,724,817 | A | | 2/1988 | Cook ................... 60/608 |
| 4,729,225 | A | | 3/1988 | Bucher ................. 60/608 |
| 4,745,754 | A | * | 5/1988 | Kawamura ........... 60/608 |
| 4,745,755 | A | | 5/1988 | Kawamura ........... 60/608 |
| 4,748,567 | A | * | 5/1988 | Sumizawa et al. ... 60/602 |
| 4,757,686 | A | | 7/1988 | Kawamura et al. .. 60/608 |
| 4,774,811 | A | | 10/1988 | Kawamura et al. .. 60/608 |

(Continued)

FOREIGN PATENT DOCUMENTS

DE 19956526 C1 * 4/2001

(Continued)

OTHER PUBLICATIONS

SAE Tech 2003-01-2294 Int'l Diesel Engine Electric Turbo Compound Technology, Ulrich Hopmann and Marcelo C. Algrain.

(Continued)

*Primary Examiner*—Thai-Ba Trieu
(74) *Attorney, Agent, or Firm*—William B. Heming; Finnegan, Henderson, Farabow, Garrett & Dunner

(57) ABSTRACT

Turbocompound systems can be used to affect engine operation using the energy in exhaust gas that is driving the available turbocharger. A first electrical device acts as a generator in response to turbocharger rotation. A second electrical device acts as a motor to put mechanical power into the engine, typically at the crankshaft. Apparatus, systems, steps, and methods are described to control the generator and motor operations to control the amount of power being recovered. This can control engine operation closer to desirable parameters for given engine-related operating conditions compared to actual. The electrical devices can also operate in "reverse," going between motor and generator functions. This permits the electrical device associated with the crankshaft to drive the electrical device associated with the turbocharger as a motor, overcoming deficient engine operating conditions such as associated with turbocharger lag.

14 Claims, 9 Drawing Sheets

U.S. PATENT DOCUMENTS

| | | | | |
|---|---|---|---|---|
| 4,798,257 | A | 1/1989 | Kawamura et al. | 60/608 |
| 4,803,969 | A | 2/1989 | Hiereth et al. | 60/608 |
| 4,805,409 | A * | 2/1989 | Kobayashi | 60/597 |
| 4,833,887 | A | 5/1989 | Kawamura et al. | 60/608 |
| 4,850,193 | A | 7/1989 | Kawamura | 60/608 |
| 4,878,347 | A | 11/1989 | Kawamura | 60/608 |
| 4,882,905 | A | 11/1989 | Kawamura | 60/608 |
| 4,901,530 | A | 2/1990 | Kawamura | 60/608 |
| 4,926,642 | A | 5/1990 | Buthmann et al. | 60/608 |
| 4,932,211 | A | 6/1990 | Buthmann et al. | 60/607 |
| 4,955,199 | A | 9/1990 | Kawamura | 60/608 |
| 4,958,497 | A | 9/1990 | Kawamura | 60/608 |
| 4,958,708 | A | 9/1990 | Kawamura | 60/608 |
| 4,981,017 | A | 1/1991 | Hara et al. | 60/608 |
| 4,989,410 | A | 2/1991 | Smith | 60/607 |
| 4,994,991 | A | 2/1991 | Richman | 364/581 |
| 4,998,951 | A | 3/1991 | Kawamura | 60/608 |
| 5,012,906 | A | 5/1991 | Meyer et al. | 60/608 |
| 5,022,353 | A | 6/1991 | Kamamura | 60/607 |
| 5,033,269 | A | 7/1991 | Smith | 60/608 |
| 5,038,566 | A | 8/1991 | Hara | 60/608 |
| 5,076,059 | A | 12/1991 | Okada | 60/607 |
| 5,088,286 | A | 2/1992 | Muraji | 60/608 |
| 5,105,624 | A | 4/1992 | Kawamura | 60/608 |
| 5,168,706 | A | 12/1992 | Kawamura | 60/608 |
| 5,214,333 | A | 5/1993 | Kawamura | 60/608 |
| 5,307,632 | A | 5/1994 | Gottemoller et al. | 60/608 |
| 5,341,060 | A | 8/1994 | Kawamura | 60/608 |
| 5,375,419 | A | 12/1994 | Wright et al. | 60/607 |
| 5,400,596 | A * | 3/1995 | Shlien | 60/597 |
| 5,400,597 | A | 3/1995 | Mirabile | 60/607 |
| 5,406,797 | A * | 4/1995 | Kawamura | 60/608 |
| 5,560,208 | A | 10/1996 | Halimi et al. | 60/608 |
| 5,678,407 | A | 10/1997 | Hara | 60/608 |
| 5,704,323 | A | 1/1998 | Gardell et al. | 60/607 |
| 5,713,204 | A | 2/1998 | Kadlicko | 60/608 |
| 5,729,978 | A | 3/1998 | Hiereth | 60/607 |
| 5,771,695 | A | 6/1998 | Halimi | 60/608 |
| 5,881,559 | A | 3/1999 | Kawamura | 60/608 |
| 5,906,098 | A | 5/1999 | Woollenweber et al. | 60/608 |
| 5,924,286 | A | 7/1999 | Kapich | 60/608 |
| 6,415,606 | B1 * | 7/2002 | Bowman et al. | 60/608 |
| 6,559,551 | B2 * | 5/2003 | Graage et al. | 290/52 |
| 6,604,360 | B1 | 8/2003 | Vuk | 60/608 |
| 6,681,574 | B2 * | 1/2004 | Berglund et al. | |
| 6,876,097 | B2 * | 4/2005 | Thomas et al. | 290/40 A |
| 6,922,996 | B2 * | 8/2005 | Ellmer et al. | 60/608 |
| 6,931,850 | B2 * | 8/2005 | Frank et al. | 60/608 |
| 2003/0188533 | A1 * | 10/2003 | Jaster | 60/608 |
| 2004/0237949 | A1 * | 12/2004 | Yasui et al. | 123/559.1 |
| 2005/0000215 | A1 * | 1/2005 | Baeuerle | 60/608 |

FOREIGN PATENT DOCUMENTS

| | | |
|---|---|---|
| FR | 2628857 A1 * | 9/1989 |
| JP | 2004076687 A * | 3/2004 |

OTHER PUBLICATIONS

Diesel Engine Waste Heat Recovery Utilizing Electric Turbocompound Tech, Dept of Energy Contract De-SC05-000R-22810.

Diesel Eng Waste Heat Recovery Utilizing Electric Turbocompound Tech, 2002 DEER Conf Aug. 25-Aug. 29, 2002 San Diego CA.

7th Diesel Engine Emissions Reduction (DEER) Workshop Aug. 5, 2001-Aug. 9, 2001.

* cited by examiner

Fig_3_

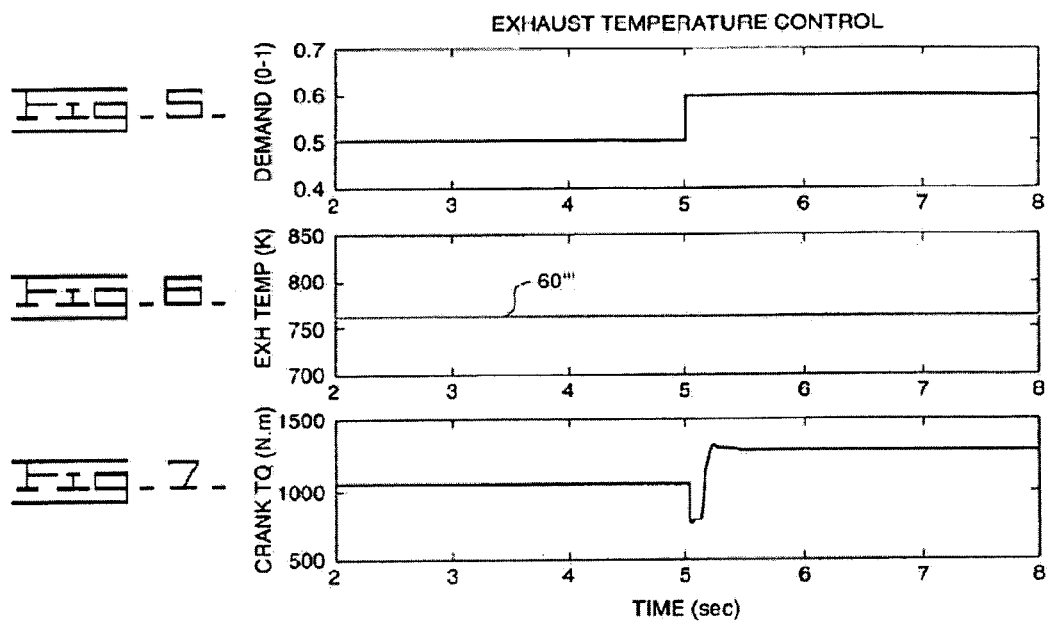
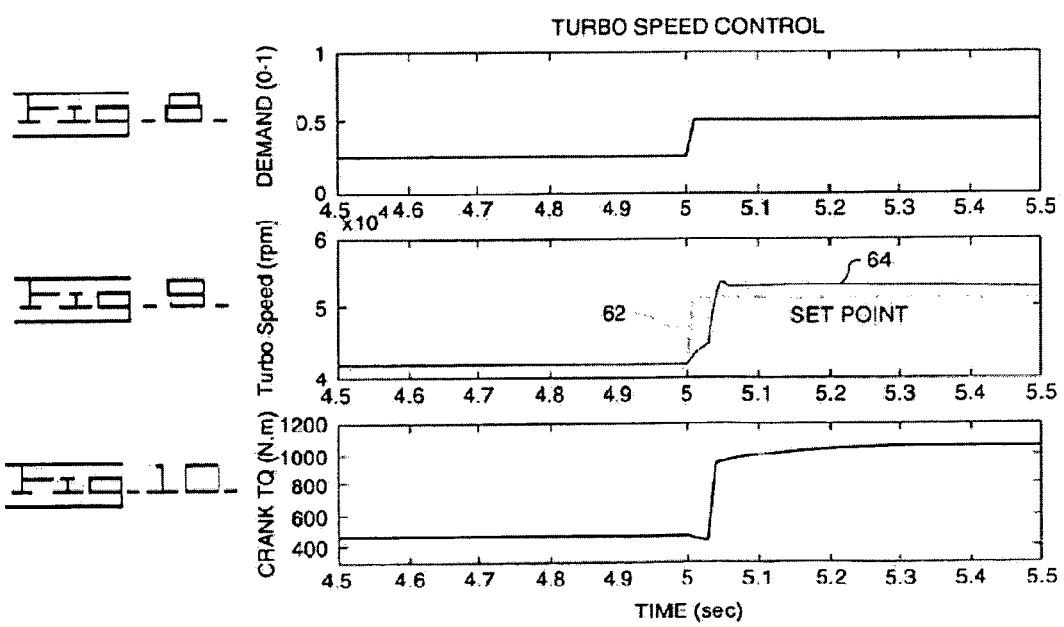

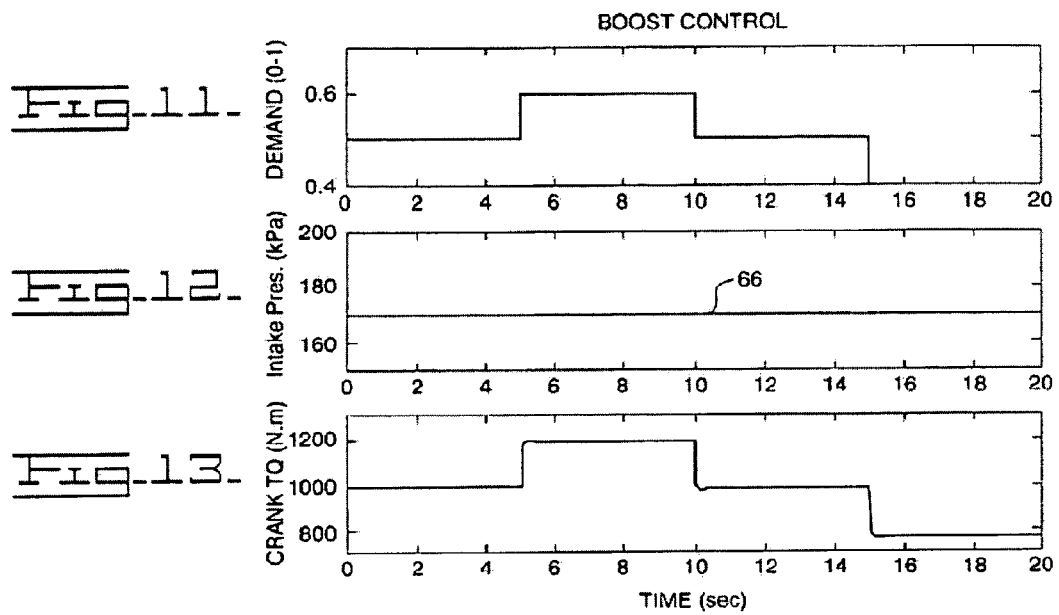
Fig-11.
Fig-12.
Fig-13.
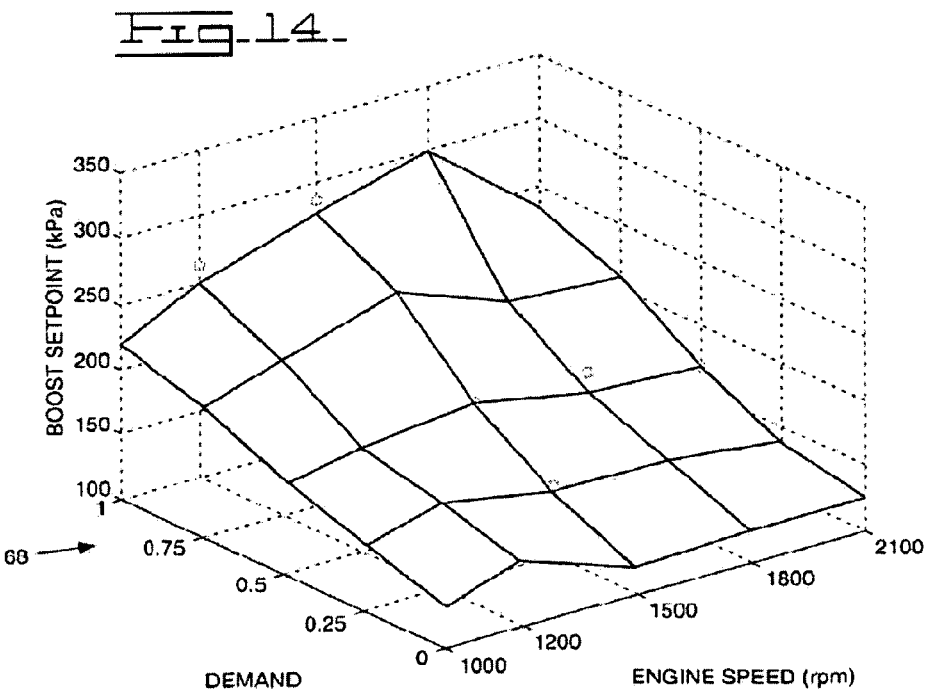
Fig-14.

ELECTRIC TURBOCOMPOUND CONTROL SYSTEM

U.S. GOVERNMENT RIGHTS

This invention was made with government support under the terms of Contract No. DE-FC05-00OR22810 awarded by the Department of Energy. The government may have certain rights in this invention.

TECHNICAL FIELD

The present invention relates to an electric turbocompound system of an engine, and more particularly relates to controlling the electrical power consumed and produced by the electric turbocompound system.

BACKGROUND

A turbocompound system of an engine assists the engine by putting mechanical power into the crankshaft of the engine. The mechanical power is developed through an electric machine or device that acts as a motor and is connected to the crankshaft. The electrical power that drives the motor is produced by another electric machine or device associated with a turbocharger and that acts as generator. Typically, this generator operates as such by rotation of the turbocharger shaft. And the turbocharger shaft rotates in response to exhaust gases from the engine that turn a turbine. While the principal purpose of the turbocharger is to compress gases with a compressor for introduction into the engine cylinders (called "boost"), the turbocompound system provides an additional mechanism to recover energy that might otherwise be lost where the energy in the exhaust gases exceeds what is needed to drive the compressor.

A turbocompound system can also provide other advantages. The electric machine associated with the turbocharger may also act as a motor instead of a generator in certain instances. And the electric machine associated with the engine crankshaft can likewise operate as a generator. In instances where the turbine cannot provide sufficient mechanical power to drive the compressor to meet the needs of the engine, the crankshaft can drive its associated electric device as a generator. Power from the generator will drive the electric machine on the turbocharger shaft as a motor, thus providing additional energy to the drive the compressor and increase the compressed air flowing to the engine.

While the adaptability of such a turbocompound system is apparent, the control of the system itself is critical to its capability to recover energy from exhaust gases that would otherwise be lost, to improve engine response under various conditions, and/or fulfill other purposes such as driving additional electrical devices. At the same time, these opportunities must be carefully managed, so that overall system efficiency is achieved.

An example of one turbocompounding system is in U.S. Pat. No. 5,678,407 issued to Hara on Oct. 21, 1997. The system disclosed uses calculated and actual engine values to determine whether the engine and the turbocharger mounted generator/motor are under certain conditions. Depending upon the condition, the generator/motor may be shifted from the generator mode to the motor mode or vice versa. The control system is designed to prevent abrupt mode changes, avoiding consequent abrupt load changes on the engine for smooth operation.

While the disclosure of the '407 patent affects the control of the engine, the aspect of control is directed to the acceleration mode of the engine. Other considerations and engine parameters are important to improve overall system efficiency, providing a control system that can maximize gains in efficiency. The disclosed invention is directed to overcoming one or more of the limitations discussed above.

SUMMARY OF THE INVENTION

A turbocompound system for an engine has a turbocharger and first and second electric machines. The first electric machine is capable of acting as a generator in response to rotation of the turbocharger. The second electric machine is capable of acting as a motor and rotatably driving the engine. A demand control is able to control the electrical power consumed by the second electric machine. A supply control is able to control the electrical power produced by the first electric machine. A comparator receives at least two signals reflective of actual operating conditions of the engine and determines respective desired operating points for the engine in response to the signals. Further included is a control to adjust the operating condition of the engine.

A method is provided for controlling an engine having a turbo-compound system. The turbo-compound system has a first electric machine generating electrical power and a second electric machine driving the engine in response to consumption of electrical power from the first electric machine. The method includes steps of having or selecting a control variable for the engine and identifying optimum operating values for the control variable at operating conditions for the engine. Further steps include identifying a difference in the control variable from a comparable optimum value for the control variable and controlling the demand for electrical power of the second electric machine power in response to the difference in the control variable. Additional steps include identifying the electrical current and voltage values present on the electrical bus, controlling the supply of electrical power by the first electric machine based upon one of the desired current and voltage of the electrical bus, and regulating the electrical power on the electrical bus to meet the demand on the bus.

In another embodiment, a turbo-compound system for an engine has a supply sub-system with a first electric machine capable of operating as a generator and a generator controller capable of regulating the electrical power generated by the first electric machine. A demand sub-system has a second electric machine capable of operating as a motor and a motor controller capable of setting a desirable electrical demand for the second electric machine. Also, a control sub-system has a controller capable of using a desired operating point of the engine as a function of operating conditions to control the amount of electrical power in the system. An electrical circuit connects the sub-systems.

BRIEF DESCRIPTION OF THE DRAWINGS

FIG. 5 illustrates the time response for a ten percent step change in engine demand;

FIG. 6 illustrates the simulated change in engine exhaust temperature in response to the change in demand illustrated by FIG. 5;

FIG. 7 illustrates the simulated change in crankshaft torque in response to the in demand illustrated by FIG. 5;

FIG. 8 illustrates the response to a step change in engine load from twenty-five percent (25%) to fifty percent (50%); [16]

FIG. 9 illustrates the simulated change in turbocharger speed through simulation in response to the step change in engine load illustrated by FIG. 8, and the expected change in speed as represented by a set point trace;

FIG. 10 illustrates the simulated change in crankshaft torque in response to the step change in engine load illustrated by FIG. 8;

FIG. 11 illustrates step changes in engine load corresponding to ten percent (10%) changes in engine load;

FIG. 12 illustrates the simulated change in intake pressure or engine boost in response to the step change in engine load illustrated by FIG. 11;

FIG. 13 illustrates the simulated change in crankshaft torque in response to the step change in engine load illustrated by FIG. 11;

FIG. 14 illustrates an engine boost set point map where boost values are plotted against engine speed and load;

DETAILED DESCRIPTION

Figure 1:
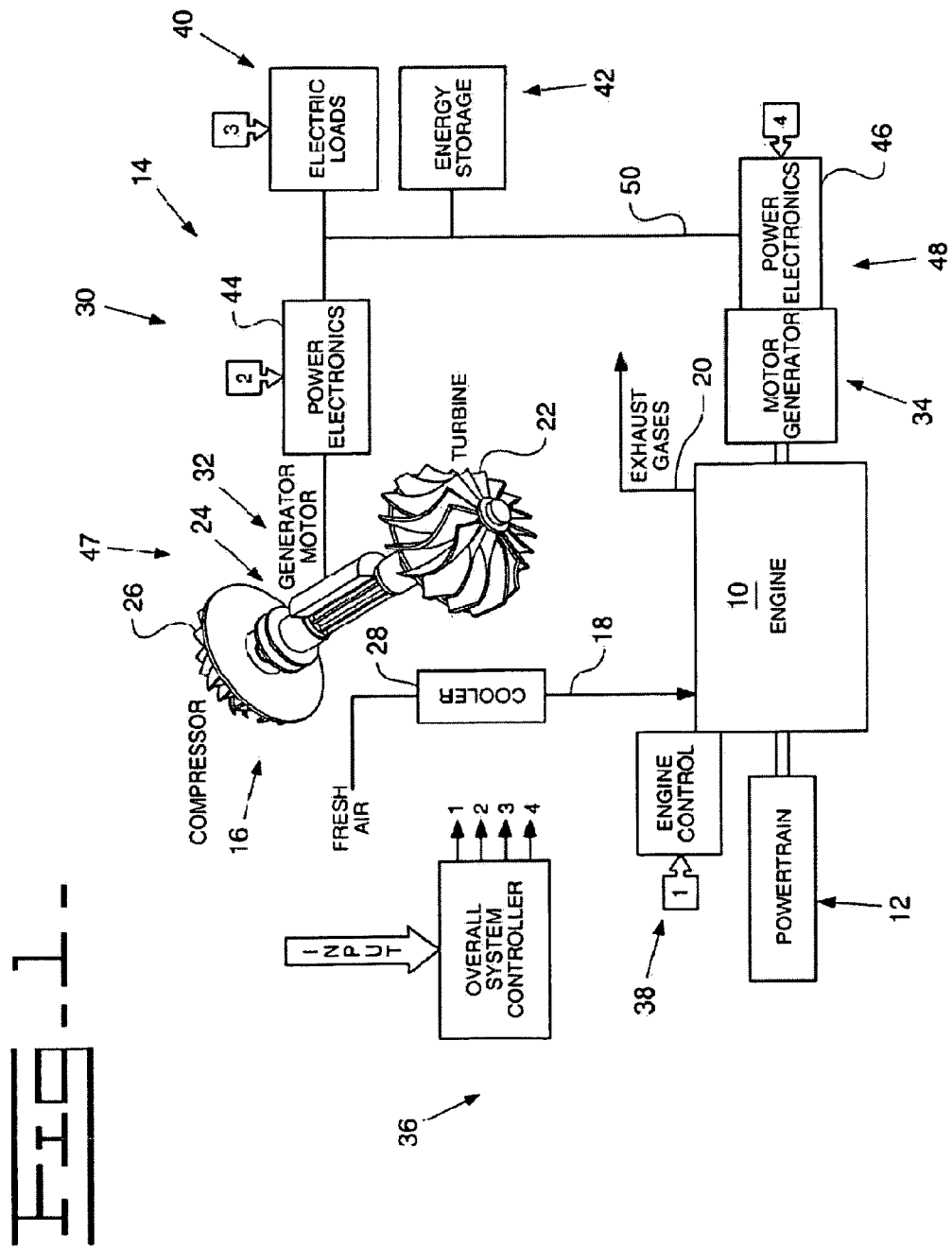
FIG. 1 is a diagrammatic view of an exemplary system for turbo-compounding of an engine.

Referring to FIG. 1, an engine 10 is shown associated with a load or power train 12 which the engine 10 drives during its operation. Commonly, a power train 12 may be a transmission, drive shaft and wheels of a vehicle (not shown). A generator used to produce electrical energy may also represent the load 12 on the engine 10 during its operation.

Also shown is a control system 14 associated with the engine 10. The control system 14 has the broad purpose of controlling operation of the engine 10 to achieve the purposes assigned to the engine 10 for particular applications. For example, in an on-highway vehicle, the control system 14 may be designed and/or programmed to assure that the engine operates within certain parameters optimum or otherwise appropriate to highway cruising. In generator or off-highway applications, the control system 14 may be designed and/or programmed to assure that different parameters are used for efficient operation. In the example shown, the control system 14 will not be discussed specifically for one application or another. Rather, its operation with respect to engine operating conditions and desirable performance characteristics of engines will be discussed. It is within the capabilities of those skilled in the art to apply the principles to specific applications.

The engine 10 has a turbocharger 16, intake manifold 18 and exhaust manifold 20. As is well known, exhaust gas from the engine 10 will pass through the exhaust manifold 20 and across a turbine 22 of the turbocharger 16 in exiting the engine 10. The turbine 22 is driven by the exhaust gases and turns a shaft 24 on which a compressor 26 is mounted. The compressor 26 is driven by the shaft 24 and compresses intake air delivered to the engine 10 through intake manifold 18. In this embodiment, the intake air is shown further passing through a heat exchanger or cooler 28 to make the incoming air denser. The turbine may have fixed or variable vanes, the latter providing an additional degree of flexibility in the system.

The engine 10 further has a turbocompounding or TC system 30. The turbocompounding system 30 includes a first electric machine or device 32 associated with the turbocharger 16 and a second electric machine or device 34 associated with the crankshaft of engine 10. Both electric machines 32, 34 are preferably capable of operating in a mode to generate electrical power (that is, as a generator or an alternator) or in a mode to consume electrical power and convert it to rotational (mechanical) power (that is, as a motor). For convenience, in describing the first electric device 32 when operating as a generator, or alternately as a motor, those terms accompanied by reference numeral 32 will be used. The same will be the case for the second electric machine 34. Such electric devices 32, 34 are also sometimes referred to as motor/generators to indicate their dual functions.

The first electric machine 32 is incorporated with the turbocharger shaft 24. This is accomplished by having the rotor (not shown) as part of the shaft 24, with the stator (not shown) in a fixed position about the shaft 24. The second electric machine 34 is connected through its rotor (not shown) to the crankshaft (not shown) of the engine 10. The construction and connection of such electric machines are well known and will not be described in detail.

In the context of the control system 14 and its TC system 30, there are several elements that will be now disclosed in overview and then in detail later. Included is an overall system controller 36 that provides comprehensive management and interfaces with an engine control 38 and an electrical loads 40 and energy storage capabilities 42. The system 14 further interfaces with power converters or controllers 44,46 associated with the first and second electric machines 32,34 respectively. As will be explained, the first electric machine controller 44 is capable of regulating the electrical power generated by the first electric machine 32. The second electric machine controller 46 is capable of setting or regulating a desirable electrical demand of the second electric machine 34. Thus, it can be considered that the first electric machine 32 and controller 46 constitute an electrical power supply sub-system 47, while the second electric machine 34 and controller 44 constitutes a second electrical demand sub-system 48. The sub-systems 47, 48, the electrical loads 40, and energy storage 42 are connected by an electrical bus or circuit 50. The control system 14, engine 10, electrical loads 40, energy storage 42 and load or power train 12 may represent, for example, a larger system that is part of a vehicle or generator set as previously mentioned.

The primary mode of operation for the TC system 30 is when the first electric machine 32 is operating as a generator. The first power converter 44 regulates the electrical power produced by the generator 32. The second electric machine 34, operating as a motor, draws power and assists the engine 10 by putting mechanical power into the crankshaft. Excess electrical power can be put into the electrical storage 42 or used to power the electrical loads 40. However, if generator 32 were unable to provide sufficient electrical energy for a particular situation, motor 34 could draw from the electrical storage 42. While the electrical storage capability 42 adds flexibility in this sense, it is not required for TC system 30.

Figure 2:
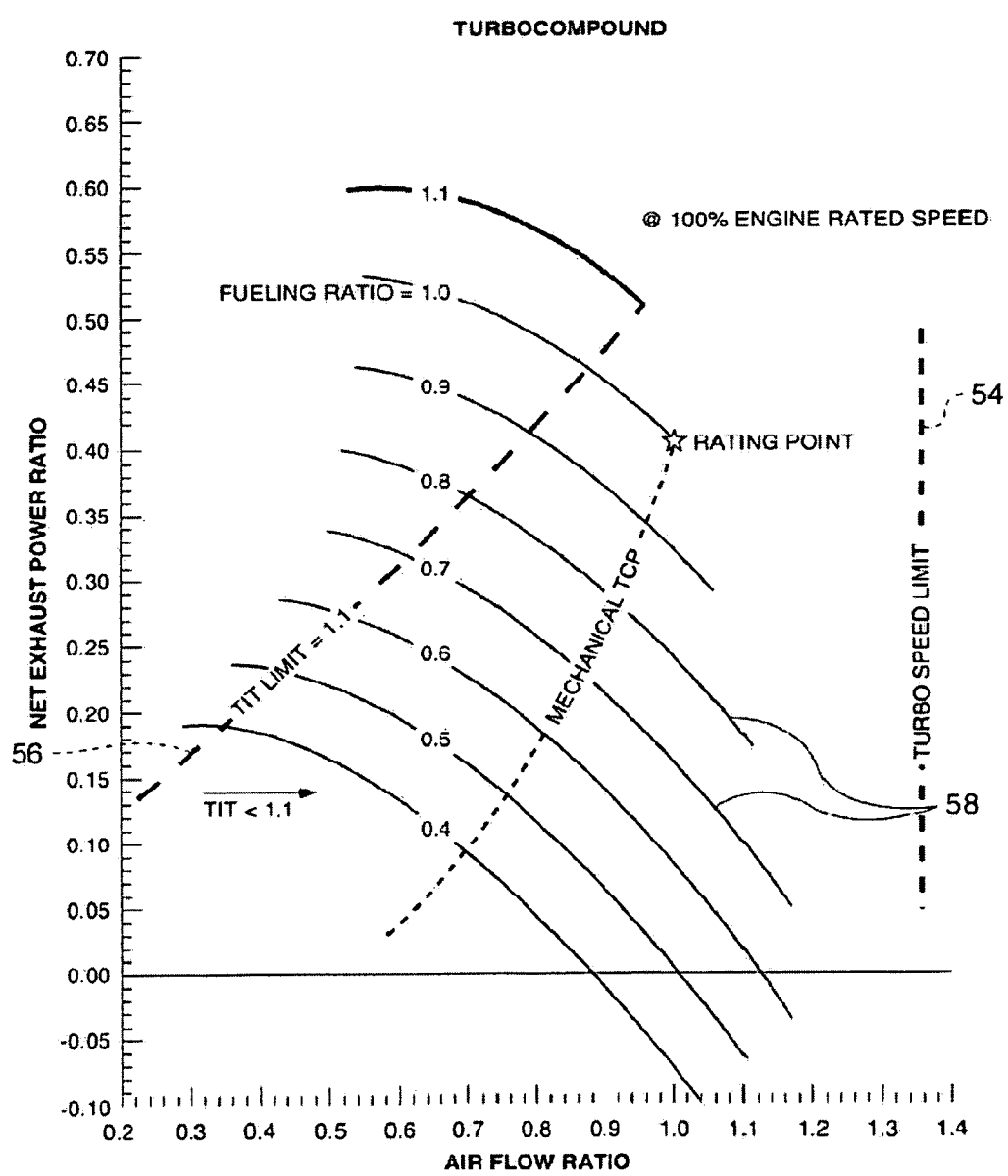
FIG. 2 is a graph of a simulation illustrating an operating envelope for a turbocharger that may be used with a turbo-compounding system.

The overriding purpose is to achieve system efficiency. FIG. 2, as well as subsequent FIGS. 3–17, will be used to illustrate basic principles of engine or system response and how system efficiency can be controlled. The data in these figures is derived from computer simulation. It should be understood that similar results to illustrate the principles discussed may be derived from actual engine tests or other computer simulations. Thus, one can use the illustrated principles to understand how to apply the described systems, steps, methods or processes for a particular application.

Apart from the balance of electrical energy produced and consumed being important, the engine 10 should operate at a desired peak efficiency. This peak efficiency will typically be determined as peak efficiency or operating points for given engine speeds and loads. One of the limits to the ability to operate at such peak points is turbocharger capability. As illustrated in FIG. 2, the operating envelope can be wide in a relative sense for system capability, even though such considerations as mechanical, thermal and emissions constraints have effect.

Specifically, FIG. 2 illustrates turbocharger operation for certain conditions. The vertical dashed line 54 on the right represents the maximum allowable speed for the turbocharger 16. The diagonal running dashed line 56 on the left represents the maximum allowable turbine inlet temperature (in this case, nine hundred and twenty (920) degrees Kelvin). The parallel arched lines 58 represent lines of constant fueling rate (normalized with respect to the nominal fuel rate at the rated power point (that is, 100%)). Other conditions (all at one hundred (100) percent of engine rated speed) are a pressure ratio of the compressor in atmospheres, or $PR_{comp}$, of 3.0 at an overall turbine efficiency of eighty (80) percent efficiency and a BP/Boost ratio of 1.24. "$PR_{comp}$" is defined as the ratio between the pressure at the outlet of the compressor over the pressure at the inlet of the compressor. "BP" is the exhaust gas pressure before the turbine. "Boost" is the charge air pressure at the compressor exit.

It will be seen from FIG. 2 that, by controlling the amount of electrical power generated for a given fueling condition, the TC system 30 can be made to run between the lines 54,56 representing the maximum allowable turbocharger speed and the maximum turbocharger inlet temperature. While specific parameters are shown on the graph of FIG. 2, such parameters are not as important as what the graph illustrates. It will be appreciated that FIG. 2 basically illustrates an operating envelope for the turbocharger 16 (between lines 54 and 56) where the turbocharger can be flexibly used. Thus, pre-set parameters can be used to protect the turbocharger 16. Given this flexibility, the control system 14, and in particular the TC system 30, can be designed and/or programmed for control strategies to achieve desirable efficiencies for given situations. For example, the control strategy may be presented to provide for maximum air handling efficiency, maximum turbocharger response, lower emissions (such as NOx), or maximum fuel economy.

Figure 3:
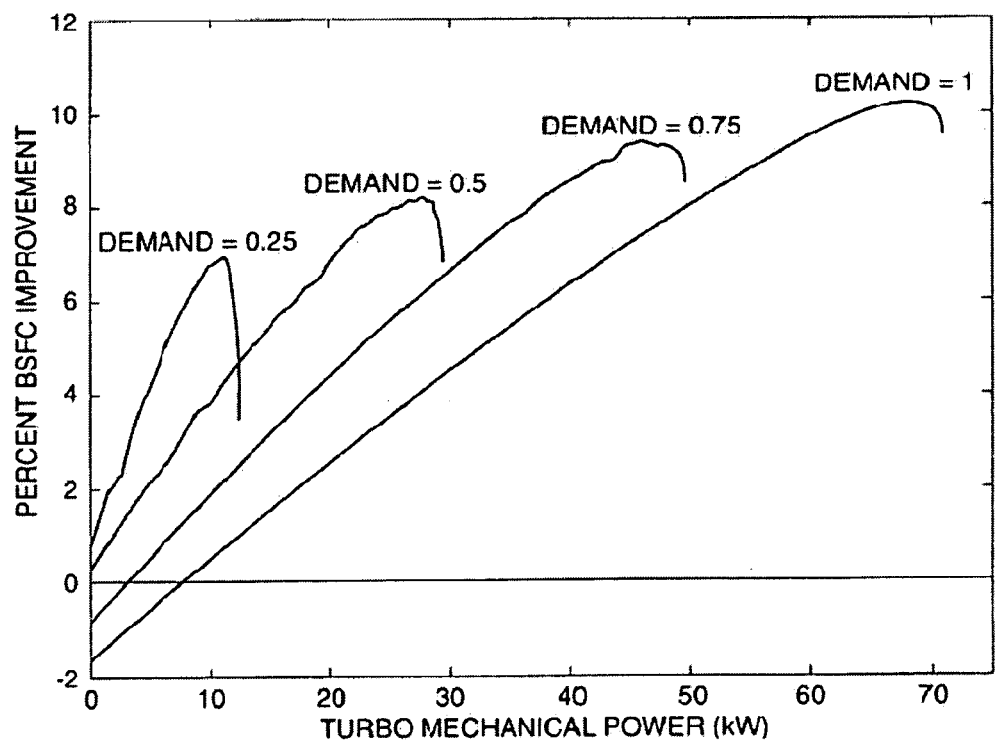
FIG. 3 is a graph of a simulation illustrating four different engine operating conditions and related changes in brake specific fuel consumption based upon recovering power through a turbocharger assisting the engine.

To illustrate, the approach of maximizing fuel economy is illustrated in FIG. 3. FIG. 3 illustrates the improvement in brake specific fuel consumption (BSFC) for an engine simulation that may be achieved by recovering energy from the engine exhaust gases. Again, the specific (assumed) parameters of the engine simulation are not as important as the instruction they provide. For a given engine or control system, similar results can be achieved and applied. For this illustration, it is assumed that the entire generator output is used to drive the motor 34 and, thus, engine 10. The motor efficiency is assumed to be ninety-two percent (92%) for motor 34 and engine speed is one thousand five hundred (1500) RPM. The four curves in the graph represent different engine loading conditions or demand. From left to right, the curves represent twenty-five percent (25%), fifty percent (50%), seventy-five percent (75%) and one hundred percent (100%) of the maximum available torque at the engine speed.

From FIG. 3, it is seen that BSFC, as a percentage, improves as more exhaust gas energy from the engine is recovered (represented along the x-axis) and used by the generator 32 to produce electrical power that drives the motor 34. For each load condition (for example, twenty-five percent (25%) of rated load), there is a point beyond which BSFC deteriorates from additional recovery of energy from exhaust gases. This illustrates that to maximize fuel economy, the engine 10 should be kept at the optimum operating point for each engine loading condition. In a similar fashion, the importance of optimum operating points for additional beneficial effects, such as lower emissions and others mentioned above, can be shown.

Figure 4:
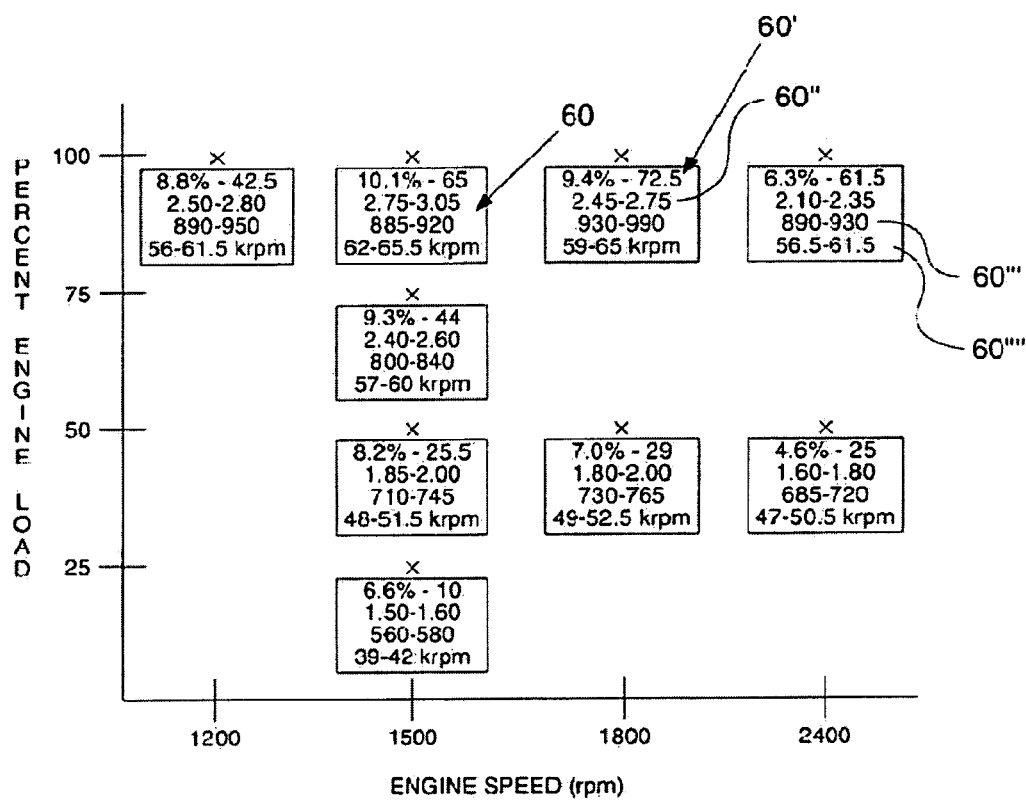
FIG. 4 illustrates optimum operating points for different engine load conditions and the value of selected variables at said points.

Exploring further the goal of maximizing fuel economy through the TC system 30, FIG. 4 illustrates values for certain variables 60 at each optimum operating point of maximum fuel economy for different engine loading conditions. These values were obtained by a computer simulation for an engine (as in FIG. 3) at the load conditions of twenty-five percent (25%), fifty percent (50%), seventy-five percent (75%) and one hundred percent (100%) of the maximum available torque at a given engine speed. Variables 60 are shown for nine different operating points and include exhaust gas power recovered 60', intake manifold pressure 60", engine exhaust temperature 60''', and turbocharger speed 60''''. An associated percentage improvement of BSFC is also shown for each operating point. As will be noted, FIG. 4 has the data from FIG. 3 for the variable represented by the recovery of engine exhaust gas power.

FIG. 4 further illustrates, through computer simulation, that the variables shown are not independent of one another in a steady state condition. In fact, for a given engine steady state operating condition, there is a unique set of values for all of these variables. Thus, if one of the variables is controlled, the others would result. The result is that strategies to maintain desired operating conditions for the engine 10 can be based upon controlling any of the variables. However, transient behavior associated with each strategy will vary. This will be illustrated in discussing FIGS. 5–13, each of which illustrates results obtained based upon the control of a different variable.

Referring to FIGS. 5–7, the engine exhaust temperature will be used as the controlled variable. In this case, the objective will be to maintain the engine exhaust temperature at a fixed value or constant set point of 760 degrees K (illustrated in FIG. 6). The engine speed, for simplicity, is kept at a constant rate of 1800 RPM (assumes very large inertia). In FIG. 5, a command for a ten percent (10%) step change in engine demand (y-axis) occurs at five seconds (x-axis). This command will be converted by the engine control 38 as a request to increase engine torque. To respond to the requested increase in engine output, additional fuel will be injected into the engine 10. The additional injection of fuel leads to a quick rise in exhaust gas temperature (FIG.

6, y-axis). To bring the exhaust gas temperature down to the set point of 760 degrees K, more air will need to be pumped into the engine 10, which requires an increase in the speed of the turbocharger 16.

To increase the speed of the turbocharger 16, the generator 32 will need to have less braking effect on the turbocharger 16 that is caused when it produces electrical power. Thus, the generator 32 will need to produce less electrical power, thereby reducing the braking torque on the turbocharger 16 and allowing the turbocharger 16 to speed up. In extreme conditions, it should be noted that electric machine 32 may need to act as a motor to help increase the speed of the turbocharger 16 (discussed later).

With less electrical power available from generator 32, the amount of torque assisting the engine 10 through the motor 34 will decrease. This is evident from the sudden drop of crankshaft torque measured along the y-axis in FIG. 7. As soon as the exhaust gas temperature begins to decrease through increased air flow into the engine 10 (FIG. 6), additional power can be recovered from the engine exhaust gases. Thus, it will be noted that crankshaft torque (FIG. 7) will increase. In addition, the engine will be working at a higher crankshaft torque level because of the increase in fueling occurring with the command for higher engine load (increased demand).

The strategy discussed in relation to FIGS. 5–7 has an undesirable characteristic for such things as the drivability of a vehicle in which the engine 10 may be used. This can be seen from FIG. 7 where the initial response of the system 14 is a decrease in crankshaft torque when higher demand is placed on the engine 10 (FIG. 5).

A second approach will now be illustrated that uses turbocharger speed as the controlled variable. FIG. 8 shows the response to a step change in engine load from twenty-five percent (25%) to fifty (50%). Again, a constant engine speed of 1800 RPM is used. The desired increase in turbocharger speed is shown by a set point trace 62 in FIG. 9. The trace 62 shows that the turbocharger speed would desirably increase from 41,500 RPM to 51,000 RPM to reach a new equilibrium point. As is shown by the simulation result (represented by line 64 in FIG. 9), actual turbocharger speed does increase closely to the desired trace. Thus, the fueling increase accompanying an increase in engine demand (FIG. 8), leads to higher energy in the exhaust gases of the engine 10 and the higher turbocharger speed. It can also be seen in FIG. 10, that an increase in crankshaft torque likewise occurs. Thus, the direction of the control action, or increase in engine demand, is consistent with the natural response of the system 14. Using this control approach, therefore, minimizes the impact on crankshaft torque, because the actual torque response of FIG. 10 is directionally correct with respect to the change in the commanded torque at all times.

FIGS. 11–13 will be used to illustrate engine intake pressure (boost) as the variable being controlled. In FIG. 11, a series of step responses is shown that corresponds to ten percent (10%) changes in engine load. The objective is to maintain engine boost at approximately 170 kPa (shown as Setpoint line 66 in FIG. 12). Upon encountering the first step change in engine load from fifty percent (50%) to sixty percent (60%) at about five (5) seconds, the intake pressure shown in FIG. 12 rises suddenly. The intake pressure, though, is quickly restored to its desired level by TC system 14 causing the generator 32 to produce more power. This is because additional load on generator 32 that causes it to produce more electrical power will slow turbocharger 16. Slowing turbocharger 16 will reduce the amount of intake air going into the engine 10, which lowers engine boost. The increased electrical power being produced by the generator 32, however, is available to assist the engine 10. Because of this, additional torque (FIG. 13) is introduced into the crankshaft through motor 34, aiding total torque production of the engine 10. It can be further seen at about 10 seconds (FIG. 12) that, when engine load steps down, engine boost will decrease along with the amount of additional torque introduced into the crankshaft through motor 34 (FIG. 13). A similar situation occurs at about 15 seconds on the X-axis.

FIGS. 11–13 illustrate that controlling boost pressure is very desirable. This is because when engine demand changes, engine boost and additional torque to the engine 10 from motor 34 change in a directionally consistent way. Furthermore, engine boost is maintainable in a fairly consistent fashion when compared to the set point. This is favorable in operation of the engine 10 in a vehicle or other application.

The prior three examples illustrate the control of different variables (i.e., control variables) to regulate the control system 14 and TC system 30. The control of engine boost is considered particularly effective for the reasons stated in the prior paragraph. However, to maximize BSFC, for example, engine boost (as would other variables) must be adjusted as a function of engine speed and load or other operating conditions during the engine's operating cycles.

In order to adjust engine boost or another variable as a function of engine speed and load, control system 14 or TC system 30 needs access to the desired or optimum operating values (set points) for the control variable for a system set up to maximize BSFC. This is commonly done through a Setpoint Map 68, such as shown in FIG. 14. In FIG. 14, the boost values from FIG. 4 have been plotted against engine speed and load. This map can, as will be explained later, then be used as a look up table for TC system 30.

Figure 15:
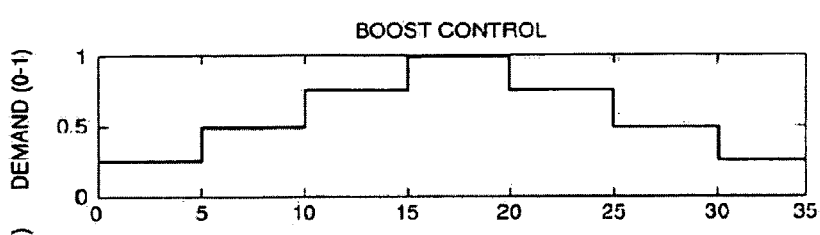
FIG. 15 illustrates the time response to step changes in engine load or demand.
Figure 16:
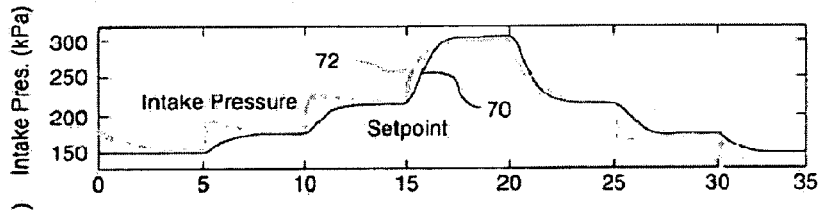
FIG. 16 illustrates the simulated changes in intake pressure or boost in response to the change in engine load illustrated by FIG. 15, and the expected change illustrated by a set point trace.
Figure 17:
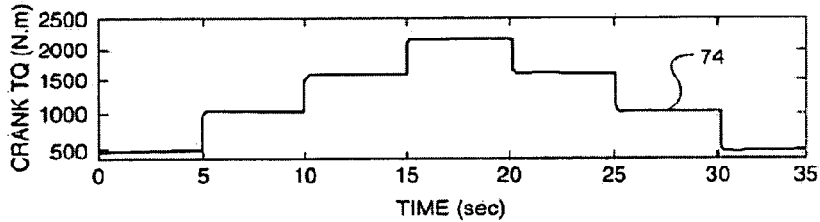
FIG. 17 illustrates the simulated changes in crankshaft torque in response to the change in engine load illustrated by FIG. 15.

To illustrate the use of the Setpoint Map 68, FIGS. 15–17 are presented to show the time response to step changes in engine load with engine speed kept at a constant 1800 RPM. Each change in engine load in FIG. 15 is accompanied by a corresponding change in the engine boost set point shown by trace 70 in FIG. 16. The actual simulation results are shown by bold line 72. Further, compensation (discussed later) is introduced in this example to soften the response to boost pressure by slowing changes in the boost. In other words, signal compensation (in this case, a first order lag filter) has been used to match the time constant of the set point filter to the boost time constant. It is shown in FIG. 16 that boost response represented by bold line 72 can be made to match step changes in engine demand (FIG. 15) very closely. Compared to FIG. 12, it will be seen that this compensation helps to avoid overshoot conditions for better engine response.

It will be appreciated that, from a propulsion and drivability standpoint, the variable of most interest is the overall torque (power) produced by the combination of engine 10 and motor 34. The trace 74 in FIG. 17 shows the sum of the torque produced by the crankshaft of the engine 10 and motor 34. The torque closely follows the requested changes in engine demand illustrated in FIG. 15. This further illustrates that the TC system 30 has the capability to provide very good drivability characteristics.

Figure 18:
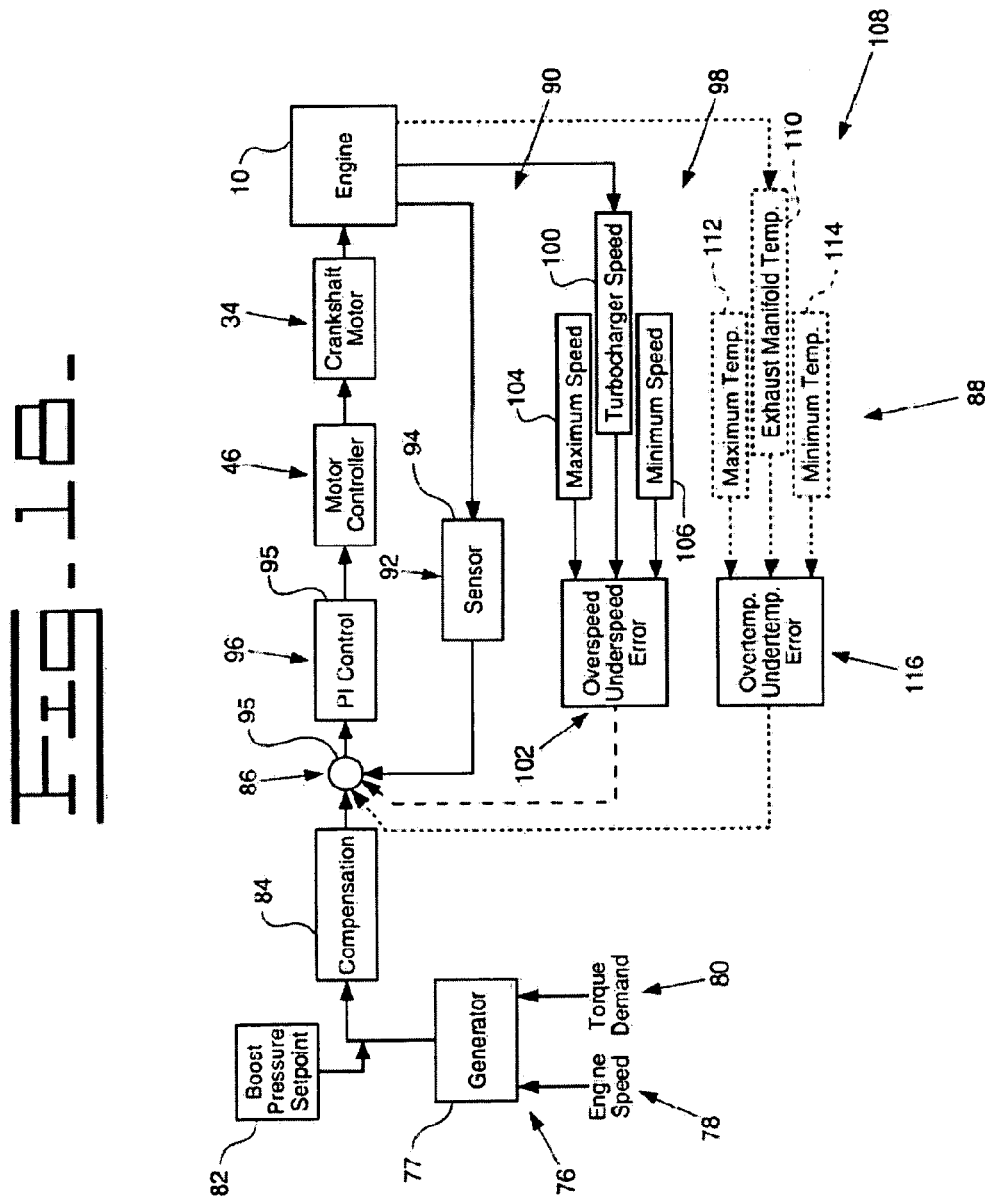
FIG. 18 illustrates features of one embodiment of a control system associated with an engine.

Additional detail for the overall control system 14, and specifically the TC system 30, is shown in FIG. 18. The illustration shows the control system 14 configured to utilize boost control to regulate operation of the TC system 30. In other words, the control variable selected is boost. This is an approach previously described in the examples illustrated by FIGS. 15–17. It will be noted that the engine 10 is controlled by the engine control 38 (sometimes called an ECM or engine control module) shown in FIG. 1.

Referring to FIG. 18, at step 76, a Set Point Generator 77 receives inputs of engine speed 78 and torque demand or load 80 on the engine 10 from sensors or other ways well known. The Set Point Generator 77 is a control device that functions to provide a signal at step 82 representative of desired or optimum manifold pressure or boost for the engine conditions 78, 80 observed. Thus, it performs a step of identifying optimum operating values for the boost control variable at operating conditions for the engine 10. In this example, Set Point Generator 77 uses the map such as shown in FIG. 14, but other approaches are known and may be used. The Set Point Generator 77 will "look up" the desired boost set point from the map, and send a signal to compensator 84. Compensator 84 implements a first order lag compensation to adjust the boost and avoid overshoots in boost pressure as previously illustrated with respect to FIGS. 15–17. Thus, at juncture 86 a filtered or compensated boost set point is provided that is desired or optimum for the engine speed and load conditions. The compensator in this example is embodied in software of the control system 14.

Also in FIG. 18 is a control sub-system 88 with further control features for control system 14. In this example, the sub-system 88 illustrates the use of three control variables: boost, engine exhaust temperature and turbocharger speed. The primary control aspect of the sub-system 88, as mentioned, is the use of a first or boost pressure feedback loop 90. This control or loop 90 is the primary control for regulating boost pressure in conjunction with the filtered boost set point delivered at 86. The actual intake manifold pressure is sensed at box 92 by a suitable sensor 94. A signal representing actual boost pressure of the engine 10 at a given point in time is then delivered to juncture 86 where it will be used for control purposes as explained below.

In the next step, a comparator 95 receives the boost pressure signal that is measured (simulated in the example) for engine operating conditions and the comparable, desired boost set point at juncture 86. Comparator 95 is represented in this example simply by operation of a "subtraction" statement in software. The comparator 95 compares the two signals and identifies a difference in the two signals. From this comparison, an "error" signal is produced. A step is then performed in which a demand control 96, in response to the error signal, provides a command signal to motor control 46 (described in more detail below) to control the torque output of motor 34. This results from regulating the amount of current going into the motor as to be explained later. Demand control 96 in this example is a proportional, integral control 96. This step thus controls the demand for electrical power of the second electric machine or motor 34 in response to the difference in the control variable from the measured or simulated control variable at certain engine operating conditions.

Two additional, exemplary feedback loops are illustrated in FIG. 18 based upon the two different control variables mentioned above. The second feedback loop 98 acts as an over-speed or under-speed control mechanism by maintaining rotational speed of the turbocharger 16 within a specified range. Actual turbocharger speed is measured at step 100 and compared at step 102 by the comparator 95 to set points 104, 106 of maximum speed and minimum speed. If the turbocharger 16 is above or below a set range, an adjustment can be made through the PI Control 96 to control motor 34 and bring the turbocharger back within the range. The allowable speed range for turbocharger 16 may also be varied based upon engine operating conditions. The range may also be made very narrow so that turbocharger speed would essentially follow a set speed (speed set point).

The third feedback loop 108 is an exhaust manifold temperature loop to keep exhaust temperatures within specified limits. It acts in a manner similar to the second loop 98 by measuring actual exhaust manifold temperature at 110 and using comparator 95 to compare that temperature to set points 112,114 for maximum and minimum manifold temperatures, respectively. The comparison is made at step 116 and an error signal is subsequently delivered through juncture 86 to contribute to the control of motor 34. Set points 112,114 can alternately be made variable to adjust to engine operating conditions or can be made very narrow to "force" engine 10 to operate at a desired exhaust manifold temperature.

While not illustrated, the second and third feedback loops 98,108 may further have feedback compensators after the comparisons at 102,116 are made, respectively. Again, it is contemplated that these compensators will be embodied in the software of control system 14. Further, comparator 95 may represent or have a separate comparator for each control variable used depending upon the choice made in the system.

Yet another example of a feedback loop may be to manage emissions. A loop that measures engine $NO_x$ emissions. A loop that measures engine $NO_x$, and compares it to set points, may be used to maintain the engine 10 within desired emission control specifications. Other loops may be added or substituted from those described above depending upon the control mechanisms desired for certain engines or applications. Of course, the control limits or set points used may also be adjusted to achieve a variety of desired operating characteristics. It will be appreciated that loops used in addition to the primary loop (such as first feedback loop 90) also provide redundancy to the control system 14 and TC system 30. Thus, for example, if the boost sensor of loop 90 fails, engine 10 will not exceed certain parameters to protect against mechanical failure or exceeding mandated parameters.

From the above, it will be seen that the control sub-system 88, using feedback loops in the illustrated examples, provides a function to control the amount of power being recovered in the TC system 30. It provides operating conditions of the engine 10 from the feedback loops 90,98, or 108. Desired operating points of the engine 10, as delivered at juncture 86, are compared to fulfill the control function.

In the example represented by FIG. 18, the various systems, loops and steps were directed to regulating demand of the second electrical machine or motor 34. A signal, based upon the inputs of boost pressure set point and the feedback loops 90,98,108, was the output of PI control 96 to set the demand for the motor 34. This motor demand is present on the electrical bus 50, as will be the demands of the electrical loads 40 and energy storage 42 where present. Such demand can be identified as either current or voltage and used to control the supply of electrical power by the generator 32. Controlling the electrical power consumed by motor 34 directly controls the load on the first electrical machine or generator 32. Thus, the load on the turbocharger 16 is directly controlled. It will be appreciated that the less electrical power (current) that is consumed by the motor 34, the less current the generator 32 will need to produce to maintain the voltage of the bus 50 constant. Further, turbocharger 16 will also provide higher boost due to less drag from the generator 32 in producing less electrical power to supply the demands of motor 34.

In summary, therefore, a step provides for the control, such as with PI Control 96, to adjust the operating condition of the engine 10 through changing demand of the motor 34 on the generator 32. This process will tend, through engine operating response to these changes, to make the actual operating condition of the engine more closely approximate the desired operating condition. Thus, the signals representative of the desired or optimum signal and the measured signal will tend to converge within capabilities to control the engine. Overall, the electrical power on the electrical bus 50 is regulated to meet the demand of the bus for one of measured current and voltage.

Figure 19:
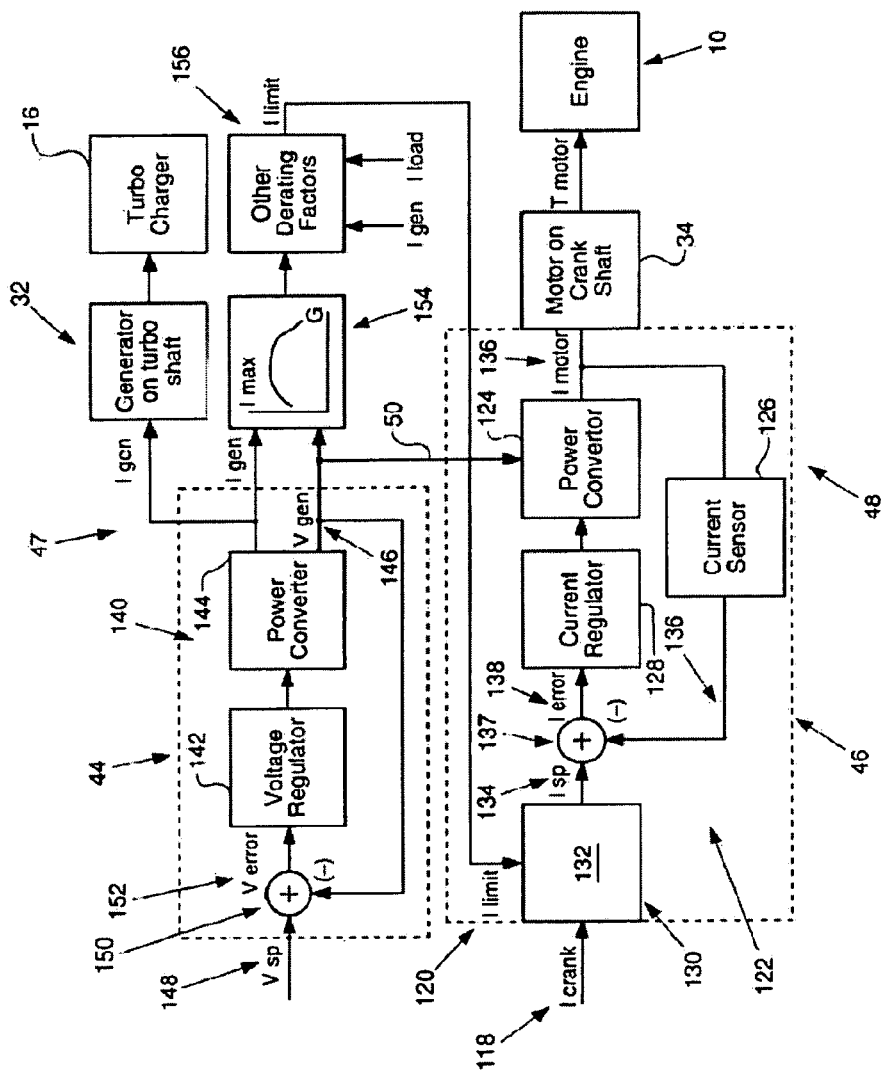
FIG. 19 illustrates features of a motor controller and generator controller associated with a control system and engine.

Referring to FIG. 19, the signal from PI control 96 is shown as $I_{crank}$ 118 (denominating "crankshaft" motor 34). This "demand" signal from PI control 96 is delivered to the demand sub-system 46 that acts as a motor or demand control (also called out as 46) to set the demand for motor 34. The demand sub-system 46 regulates one of voltage and current in the bus 50 to achieve its purposes. Typically, it will regulate in terms of motor current, and thus current on the bus 50. Also shown on FIG. 19 is supply sub-system 44 that acts as a generator or supply control 44. The supply sub-system 44 regulates the other of voltage and current in the bus 50 to achieve its purposes. Typically it will regulate voltage.

Motor control 46 and generator control 44 (also shown in FIG. 1) are connected with one another through a portion of electrical bus 50 and exchange a signal $I_{limit}$ 120. Signal $I_{limit}$ 120 provides a mechanism to limit motor current demand to account for derating factors and/or limiting conditions that may be encountered during operation of control system 14. In other words, for example, if the windings of generator 32 get too hot and exceed normal operating conditions, the $I_{limit}$ signal will be used, as described below, to protect generator 32.

The motor control 46 utilizes a current loop 122 having a power converter 124, a current sensor 126, and a current regulator 128. This loop 122 within motor control 46 is used to maintain the motor 34 operating at the desired torque or load level. To illustrate, the signal $I_{crank}$ 118 will ordinarily be used to control motor 34. However, as discussed above, the smaller of signal $I_{limit}$ 120 and signal $I_{crank}$ 118 is selected at a step 130 to protect generator 32. Step 130 is simply represented by operation of an "if" statement or comparator 132 in software in the embodiment shown.

The selected signal or $I_{sp}$ 134 is used to develop an error signal or current differential. This is done by comparing $I_{sp}$ 134 to the actual current signal ($I_{motor}$ 136) of motor 34 at step 137. A signal representing $I_{motor}$ 136 current is generated by sensor 126 and delivered for such comparison purposes. The difference, or error signal 138 ($I_{error}$), is used by current regulator 128 to set the demand for motor current. Current regulator 128 is also a proportional, integral control. The command for regulated current based upon the error signal 138 is subsequently delivered to a power converter 124 to provide adjustment to the current sent to the crankshaft motor 34.

The generator control 44 regulates the operation of generator 32. Thus, generator control 44 typically addresses the supply side of electrical power for the motor 34, while motor control 46 addresses the demand side. Control 44 is thus capable of regulating the electrical power generated by the generator 34. In the example shown, a voltage loop 140 controls the amount of electrical power produced by generator 32 to meet the electrical loads on electrical bus 50. In other words, generator 32 is controlled to maintain voltage in bus 50 at a desired value. The object is to tightly regulate the bus voltage, so that generator 32 produces the right amount of electrical power to supply motor 34 and any other loads present on bus 50.

Closed voltage loop 140 includes a voltage regulator 142 and combined generator and power converter 144 that includes generator 32. Actual voltage or $V_{gen}$ 146 of generator 32 is compared with voltage demand or $V_{sp}$ 148 at step 150. The resultant error signal or $V_{error}$ 152 flows to voltage regulator 142 where it is conditioned for generator and power converter 144. Eventually, $V_{error}$ will reduce to zero at steady state conditions for demand on bus 50, and generator 32 will produce the electrical power necessary to meet such demand. Electrical circuit or bus 50 is thereby maintained at the desired voltage.

Outside of voltage loop 140 in FIG. 19 are additional control mechanisms to regulate output of generator 32 and motor 34. The engine 10, as previously discussed, will have ratings, limiting conditions or other characteristics that it is desirable to control beyond the demand of motor 34 or other loads on bus 50. As an example, a set point map 154 and derating control 156 are used to determine the limit ($I_{limit}$) of motor current that may be permitted. Thus, if a manufacturer desires to limit the torque that motor 34 can contribute to engine 10 for a given set point found on map 154, or based upon derating factors embodied in control 156, this functionality can be performed. As previously mentioned, $I_{limit}$ is used in motor control 46. Limiting the current to motor 34 constrains the electrical power demand on the generator 32, and thus the amount of mechanical power extracted from the turbocharger shaft. The more electrical power produced, the higher the braking torque on the turbocharger shaft. Thus, adjusting the electrical power produced by the generator 32 results in speeding or slowing of turbocharger 16. This affects the boost that turbocharger 16 provides to engine 10.

As earlier mentioned, electric machines 32, 34 may also operate alternatively as a motor 32 and generator 34, respectively. Such a situation will be desirable where, for example, the engine 10 is operating outside the envelope where exhaust energy recovery is feasible or otherwise being outside of certain operating parameters. One example of being outside acceptable parameters is where turbocharger lag is occurring. Lag is a condition where rotational speed of the turbocharger's compressor section is insufficient to meet air intake needs for a given demand on the engine 10. This will occur where the turbine section is unable to extract sufficient energy from engine exhaust gases. Turbocharger lag may occur when a vehicle is coasting and an operator pushes on the accelerator pedal of the vehicle to speed up. With the engine at exhaust gas energy levels from coasting, the turbocharger will be rotating slowly and not be able to react quickly enough to provide sufficient combustion air to the engine to meet requested demand.

The present system 14 will permit a switch over of the electrical devices 32, 34 to motor and generator functions, respectively. Switch over will occur in response to a signal from at least one or more sensors capable of providing a signal indicative of the out of parameter condition. Signals may also be input for other parameters for control purposes, as well. In the example above, change in demand results in a request for additional fuel to the engine that can be used as a signal to trigger the switchover to motor and generator functions while under an out of parameter condition. Fueling sensors (not shown, but typically used in the engine control 38 for other purposes) may be used to sense that demand. The signal produced by the sensor may be then input as torque demand 80 (FIG. 18). At the same time, the speed of the engine 10 is being sensed and input as engine speed 78.

Set Point Generator 77 (FIG. 18) uses signals 78,80 to produce a new boost set point for the out of parameter condition. With electrical device 34 now acting as a generator, if the actual boost is below the desired value, control sub-system 88 increases the amount of electricity being produced. This results in additional current flow out of electrical device 34. To keep bus voltage 50 at the desired value, the current into electrical device 32 (acting as a motor) is increased. The increase results in additional torque being put onto the turbocharger shaft, which increases the speed of turbocharger 16 thereby providing more air to engine 10.

Step 76 in this example is capable of determining desired operating points for given operating conditions of the engine 10, including the out of parameter conditions. In an embodiment to be described, generator 77 will have first and second maps, similar to the map shown in FIG. 14. The first map is used to determine desired operating points for engine conditions other than those associated with the out of parameter conditions. In other words, the first map will be used when controlling demand of the motor 34 and supply of the generator 32 (as discussed in earlier examples). The second map will be used to determine desired operating points or engine conditions associated with the out of parameter conditions. Likewise, controller gains and signal compensators within control sub-system 88 may take different values depending upon whether engine 10 is operating in "in" or "out" of parameter conditions.

By way of further explanation, the relative condition indicative of turbocharger lag (based from pre-determined high demand, low speed conditions) will cause the logic of Setpoint Generator 77 to choose the second Setpoint Map provided for such conditions. In response to the indicated conditions for turbocharger lag, second electric machine 34 will switch over to function as a generator and be capable of providing electrical power (from being driven by the crankshaft) to the first electric machine 32. The Setpoint Map for turbocharger lag conditions will be similar to that illustrated in FIG. 14, but will have turbocharger rotational speed values plotted against engine speed and load. In this map, engine speed will be representative of the requested demand. From this "lag" map, a set point is identified that will represent turbocharger rotational speed desirable or optimum for requested engine conditions.

Feedback loop 98 (FIG. 18) provides measured turbocharger speed so that an error signal at juncture 86 can be obtained from a comparison of the requested turbocharger speed and actual turbocharger speed. A comparator as at 95 compares the desired turbocharger speed from the second map and the operating speed of the turbocharger 16. A signal indicative of the comparison—an "error" signal—delivered to a control regulates the second electric machine 34. For illustrative purposes, the control will also be motor controller 46 from FIG. 18. This control 46 will have the further capability to regulate the second electric machine 34 to act as a generator 34. In response to the comparison and use of the error signal, generator 34 will provide a desired or demanded amount of electrical power to the first electric machine 32. The first electric machine 32 now acts as a motor in response to electrical energy being applied, and will act to increase the rotational speed of turbocharger toward the set point requested. This speed increase will provide more air to the engine 10 to satisfy demand. When the engine 10 is again operating without turbo lag, the first and second electrical machines 32, 34 will transition back to their generator and motor functions, respectively.

INDUSTRIAL APPLICABILITY

The TC system 30 and overall control system 14 provide a high degree of control, and many options, for turbo-compounding engine 10. The system can be visualized as having three control loops. A loop to control the amount of electrical power being produced by generator 32 is illustrated by voltage loop 140. Another loop, represented by current loop 122, controls the amount of electrical power consumed by motor 34. A third loop controls the amount of power being recovered through TC system 30. In the exemplary description for FIG. 18, this third loop is represented by a primary or first feedback loop 90 and the additional feedback loops 98,108 described. It is this third loop that regulates engine 10 and overall system 12 to a desired operating point. This control system architecture is also applicable when electrical devices 32,34 act as a motor and generator, respectively. Operational differences between the two modes can be achieved by running different sections within the software of the control system.

As will be appreciated, another embodiment may have current loop 122 be instead used to control voltage. Voltage loop 140 would then be used to control current. Further, it is desirable to avoid interactions between loops 122,140, as well as first 90 (and second 98 and third 108) feedback loops. This is accomplished by watching the time constants for the loops. In a preferred embodiment this would be accomplished by having the generator voltage loop have the fastest time constant, followed by the motor current loop 122 and then the feedback loops 90,98,108.

Thus, it will be appreciated that the disclosed systems, steps and apparatus provide a great deal of flexibility to control an engine having turbo-compounding. This control enables the recovery of energy from operation of the engine, with the added capability, where desired, to keep the engine within set limits of performance or other requirements.

The embodiments illustrated above and in the drawings have been shown by way of example. There is no intent to limit the invention to the exemplary forms disclosed. All modifications, equivalents and alternatives falling within scope of the appended claims are to be covered.

What is claimed is:

1. A method of controlling an engine in a turbo-compound system having a first electric machine generating electrical power in response to engine exhaust flow, a second electric machine driving the engine in response to electrical power from the first electric machines, and an electrical bus connecting the first and second electric machines, comprising:
   having a control variable for the engine;
   presenting optimum operating values for the control variable at operating conditions for the engine;
   identifying a difference in a measured value representing the control variable from a comparable optimum value for the control variable at certain engine operating conditions;
   controlling the demand for electrical power of the second electric machine power in response to the difference identified;
   identifying one of the electrical current and voltage values present on the electrical bus taking into account the demand of the second electric machine;
   controlling the supply of electrical power by the first electric machine based upon one of the desired current and voltage of the electrical bus; and
   regulating the electrical power on the electrical bus to meet the demand on the bus for the one of the current and voltage.

2. The method of claim 1 wherein controlling the supply of electrical power by the first electric machine is based upon voltage.

3. The method of claim 1 wherein controlling the supply of electrical power by the first electric machine is based upon current.

4. The method of claim 1 further including controlling the amount of electrical power recovered through the turbocompound system in response to identifying the difference in the desired value of the control variable and the value of the control variable at certain engine operating conditions.

5. The method of claim 4 further including using different time constants during controlling the demand of electrical power of the second electric machine, controlling the supply of electrical power by the first electric machine and controlling the amount of electrical power recovered through the turbocompound system.

6. The method of claim 1, further including controlling one of the speed of the turbocharger, boosts, and exhaust temperatures within a set range.

7. The method of claim 1, furthering including establishing control variables based upon optimum operating conditions for a particular control strategy of the engine, the control strategy being based upon one of maximizing fuel economy, lowering emissions, regulating turbocharger responses, and regulating air handling efficiency.

8. A turbocompound control system for an engine, having a turbocharger driven by exhaust gases, a first electric machine rotatably coupled to the turbocharger and capable of acting as a generator in response to rotation of the turbocharger, and a second electric machine rotatably coupled to the engine and capable of acting as a motor to drive the engine, the system comprising:
   a demand control to control the electrical power consumed by the second electric machine;
   a supply control to control the electrical power produced by the first electric machine;
   a comparator receiving at least two signals reflective of actual operating conditions associated with the engine and respective desired operating points associated with those operating conditions; and
   a control to adjust the operating condition of the engine through changing demand of the second electrical device on the first electrical device so that the signal reflective of at least one of the actual operating conditions more closely approximates its respective desired operating point.

9. The turbocompound control system of claim 8, wherein the at least two signals are reflective of operating conditions selected from at least two of: engine exhaust temperature, turbocharger speed, and engine boost pressure.

10. The turbocompound control system of claim 8, wherein an electrical bus connects the first and second electric machines, and the supply control regulates one of the voltage and current on the bus.

11. The turbocompound system of claim 8, wherein the first electric machine is further capable of acting as a motor driving the turbocharger;
   the second electric machine is further capable of acting as a generator; and further including
   a control that regulates the second electric machine to act as a generator in response to a signal received by the comparator.

12. The turbocompound system of claim 11 wherein the control regulates the second machine to act as a generator when the comparator receives a signal indicative of a lag condition of the turbocharger.

13. A turbocompound system for an engine, comprising:
   a turbocharger;
   a first electric machine that acts alternatively as one of a generator and motor in response to certain engine conditions and being driven by the turbocharger when acting as a generator;
   a second electric machine that acts alternatively as one of a motor and a generator in response to certain engine conditions, driving the engine when acting as a motor and driving the turbocharger when acting as a generator;
   at least one sensor that provides a signal indicative of an out of parameter condition for the engine as it operates;
   a set point generator that determines desired operating points for given operating conditions of the engine and having first and second maps, the first map being used to determine desired operating points for engine conditions other than those associated with the out of parameter condition and the second map being used to determine desired operating points for engine conditions associated with the out of parameter condition;
   a comparator that compares one of the desired operating points and a measured operating point of the engine based at least in part on the signal indicative of when the engine is operating in the out of parameter condition; and
   a control that regulates the second electric machine to act as a generator providing a desired amount of electrical power in response to comparison of the desired and measured operating points.

14. The turbocompound system of claim 13 wherein the out of parameter condition is turbocharger lag.

* * * * *